United States Patent [19]

Risse

[11] 4,301,035
[45] Nov. 17, 1981

[54] CATALYST MASS FOR HETEROGENEOUS CATALYSIS

[75] Inventor: Roger P. P. Risse, Caluire, France

[73] Assignee: Societe Lyonnaise des Applications Catalytiques, Rillieux, France

[21] Appl. No.: 30,893

[22] Filed: Apr. 17, 1979

[30] Foreign Application Priority Data

Apr. 25, 1978 [FR] France ................... 78 12878

[51] Int. Cl.³ .................. B01J 21/12; F23D 13/18; F24J 1/04
[52] U.S. Cl. ................ 252/455 R; 252/462; 431/7; 126/263
[58] Field of Search ........... 252/455 R, 462; 431/5, 431/7; 126/263

[56] References Cited

U.S. PATENT DOCUMENTS

| 4,029,602 | 6/1977 | Risse | 252/458 |
| 4,048,113 | 9/1977 | Risse | 252/462 |
| 4,168,945 | 9/1979 | Kirby | 431/7 |

*Primary Examiner*—Carl F. Dees
*Attorney, Agent, or Firm*—Karl F. Ross

[57] ABSTRACT

A catalyst mass for heterogeneous catalytic reactions, especially the flameless burning of hydrocarbons, comprises a support consisting of impurity-free silico-alumina fibers and a catalyzer which consists of at least one element (in elemental form) and at least one other oxide of an element from groups III, VI, VIIIb and VIIIc and the rare-earth elements of the periodic table.

9 Claims, 3 Drawing Figures

U.S. Patent
Nov. 17, 1981
4,301,035
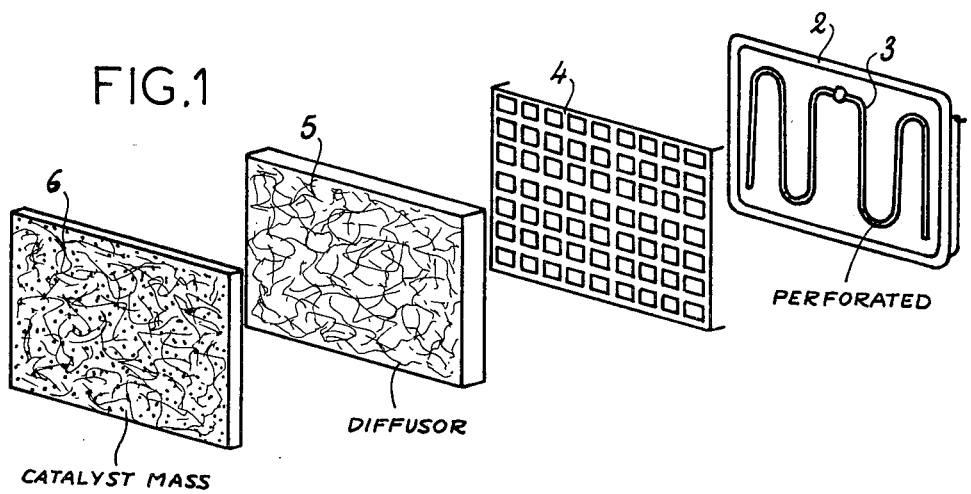
FIG.1
6 — CATALYST MASS
5 — DIFFUSOR
4
2, 3 — PERFORATED
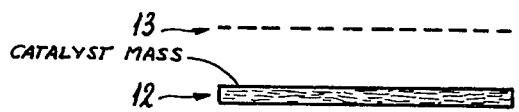
FIG.3
13 — (dashed line)
12 — CATALYST MASS
10
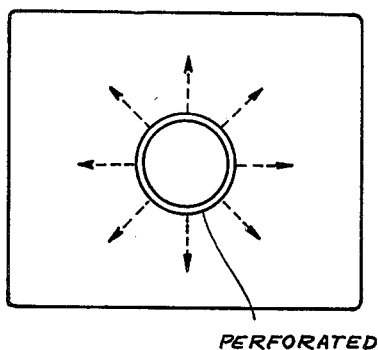
FIG.2
PERFORATED
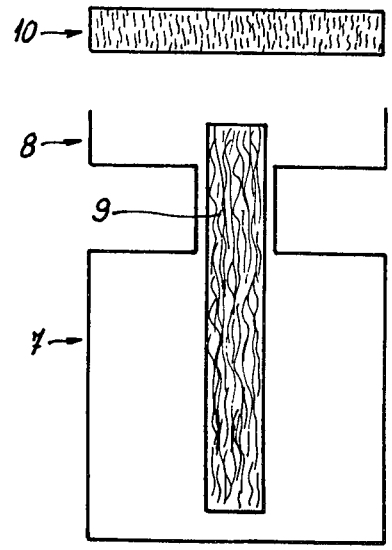
8
9
7

CATALYST MASS FOR HETEROGENEOUS CATALYSIS

FIELD OF THE INVENTION

The present invention relates to a contact catalyst for catalyzing heterogeneous reactions and, more particularly, to a catalyst mass for contact catalysis in the flameless combustion of hydrocarbons.

BACKGROUND OF THE INVENTION

Heterogeneous reactions, i.e. the reactions of a fluid phase (e.g. a gas) on a solid surface are commonly catalyzed by a contact catalyst mass of selected composition.

In practice, the effectiveness of a contact catalyst for heterogeneous reactions depends not only upon the composition of the mass but also upon the nature and composition of its support and hence the combination of the two. In other words the poor selection of a support will result in diminution or elimination of the activity of the catalyzer in certain zones of the catalyst. Similarly a support which is effective for certain catalytically active materials will be detrimental to others or will not allow reaction upon these other materials.

The specificity of the catalytically active material with respect to its support increases as the sensitivity to the reaction conditions of this material becomes more pronounced. For example, the choice of a support becomes more important as the reaction becomes more sensitive because of a reduced activity or affinity of the reactants for one another under certain temperature, pressure or reactant-concentration conditions, or the like.

In catalytic combustion, compounds such as ethane, butane, propane and heptane are effectively oxidized at relatively wide-ranging temperatures and high concentrations, while methane may only be oxidized with difficulty. This can be attributed in large measure to the low affinity of methane and oxygen in the presence of a catalyst, especially at very low temperatures.

The oxidations reaction can be improved by using catalyst supports having an especially large specific surface and specially designed structure or texture, e.g. alumina wool. A catalyst mass on such a support is capable of effecting a conversion of methane close to unity (100%) even under moderate temperature conditions. The mass is thus compatible with use in catalytic heaters or other apparatus designed for flameless combustion at low temperatures.

However the alumina fibers and the contact mass employed therewith create certain problems which can only be overcome with considerable difficulty. These include the migration of elements of the catalyst mass on the fibers and the retention of various salts of active elements of the catalyzer in solution on the fibers.

These physical phenomena reduce in large measure the efficiency of the active mass unless they are controlled rigorously and can require the use of larger catalyst masses than would otherwise be the case. This adds significantly to the operating and purchase cost of the catalytic materials.

It is possible to use as supports other refractory materials such as asbestos, silica wool and metal-wire cloth which are less effective in the catalytical oxidation of methane.

Insufficient activity of the catalytic mass generally results in a high output of non-oxidized gas and hence the carbon dioxide produced is accompanied by compounds of lesser degrees of oxidation such as aldehydes and acids. Such reduced activity is essentially a result of low or lowered specific surface of the material constituting the support or of a modification of the surface texture so that the contact surface presented to the reactants is reduced.

It has also been proposed to use as supports materials of a highly advantageous texture such as silico-aluminous (silica-alumina) fibers in which the silica and alumina components are present in substantially equal proportions. While such supports give excellent results for the catalytic oxidation of propane and butane, for example, they are not always satisfactory for the catalytic oxidation of methane. The lesser activity as to methane can be partially compensated in increasing significantly the proportions of the catalyzer in the catalyst mass or by substituting for the catalyzers usually used, catalyzers consisting only of noble metals such as platinum. Because of their cost, however, such catalyst masses are prohibitive for industrial purposes.

In this connection reference may be had to my earlier U.S. Pat. No. 4,029,602 of June 14, 1977 and No. 4,048,113 of Sept. 13, 1977 and the art, publications and references of record therein.

OBJECTS OF THE INVENTION

It is the principal object of the present invention to provide an improved catalyst mass for heterogeneous contactcatalyst reactions.

Another object of this invention is to provide a relatively low-cost catalyst mass, especially effective for the complete flameless combustion of methane which is free from the disadvantages enumerated above of the earlier systems.

Yet another object of the invention is to provide a high-efficiency hydrocarbon-combustion catalyst which permits complete combustion of methane even at low or moderate temperatures which is sufficiently economical for use in catalytic heaters and industrial application and which has a long useful life while requiring little maintenance or care.

SUMMARY OF THE INVENTION

These objects and other which will become apparent hereinafter are attained, in accordance with the present invention, in a catalyst mass for the purposes described which consist essentially of a silico-alumina fiber support with proportions of silica and alumina respectively between 40% and 60% by weight and a catalyzer which consists essentially of at least one element (in elemental form) and at least one oxide of an element selected from the groups III, VI, VIIIb, VIIIc, and the rare-earth elements of the periodic table. The periodic table referred to herein can be the chart at pages 448 and 449 of *Handbook of Chemistry and Physics*, 41 ed., Chemical Rubber Publishing company, Cleveland, 1960. The groups VIIIb and VIIIc are the transition elements of group VIII which have 9 and 10 electrons in their outer electron configurations (pages 870 and 972, *Inorganic Chemistry*, Moeller, John Wiley and Sons, New York, 1952), i.e. cobalt, nickel, rhodium, iridium, palladium and platinum. Groups III and VI include the metals of Groups IIIA, IIIB, VIA and VIB.

Preferably the element or elements in elemental form are different from the element or elements present as the oxide.

The weight ratio of catalyst/support should be 0.001 to 0.02 for the elemental metal or metals and 0.01 to 0.2 for the metal oxide or oxides.

The fibers are arranged in sheet or layer form devoid of any organic binder. The density of the catalyst mass should be between 0.04 and 0.1, preferably about 0.06. The thermal stability of the fibers prevent modification of the structure or texture with prolonged exposure to temperatures to 900° C. and the specific surface of the fibers should be between 0.5 and 1 $m^2/g$.

The length of the silico-alumina fibers is unimportant but should be sufficient to permit the formation of a coherent metal.

The elements of the catalyzer component, whether in elemental form or as the oxide or preferably selected from the group which consists of aluminum, chromium, cobalt, platinum, palladium and cerium. It is important that the catalyst mass be free from impurities and other elements, especially iron, and the absence of iron is of particular signifcance in the fiber or support component.

BRIEF DESCRIPTION OF THE DRAWING

The above and other objects, features and advantages of the present invention will become more readily apparent from the following description and specific examples, reference being made to the accompanying drawing in which:

FIG. 1 is an exploded view of a catalyst burner assembly according to the invention;

FIG. 2 is a plan view of a gas distributor for a diffuser and catalyst mass which can have circular disk configurations; and FIG. 3 is an exploded view, in diagrammatic section, illustrating an apparatus for carrying out a reaction with a liquid hydrocarbon.

SPECIFIC DESCRIPTION

In the following description, reference will be made to a gas distributor and to a diffuser which are provided upstream of the catalyst mass with respect to the direction of gas flow.

The diffuser has as its primary function the homogeneous distribution of the gas over the area of the catalyst mass and can lie on contact with it. The primary function of the distributor is to spread the gas in the form of streamlets over the diffuser.

The distributor and diffuser can function thermally as heat-storage bodies or can be provided with heaters to generate or maintain the temperature of the catalyst mass or to heat the incoming gas to a temperature sufficient to sustain sufficient oxidation reaction.

It is important in any case to avoid any secondary reactions which might effect the final balance of the oxidation reaction and hence the diffuser should be free from elements or compounds (e.g. iron oxides) which can be detrimental in this respect.

The diffuser material thus can be the same as that of the catalyst support or another material inert to the combustible used or to the reaction sustained.

The gas distributor can be of any known type ahead of the diffuser body. For example, in the best-mode embodiment of the invention it is a serpentine metallic tube provided with a multiplicity of orifices whose number and diameter can depend upon the type of combustible fed to the catalyst mass. Such an arrangement is shown in FIG. 1 for a flameless heater operated with methane.

The heater body 2 has a serpentine perforated metal tube 3 in communication with the combustible source for distribution of the gas ahead of a support grill 4 to a diffuser panel 5 of silico-alumina fibers and the catalyst mass 6.

The distributor can also have a ball or circular (rosette) configuration whose orifices are distributed over the circular tube or ball in a number, spacing and size which is a function of the type of combustible gas used.

In the case of a combustible which is liquid at standard temperature and pressure, such as heptane, the catalyst mass can be fed with vapors of the combustible using the system shown in FIG. 3.

The combustible liquid is drawn from a reservoir 7 to the burner body 8 by a mesh 9 which is composed of a material having good capillary (wicking) properties. The combustible liquid vapors at the upper level of the mesh and the vapor fills the burner body 8 and the diffuser layer 10. The slight pressure thus obtained causes the vapor to traverse the catalyst mass 12 in which the vapor catalytically reacts in the manner described. The catalyst mass is covered by a protective grill 13.

The reaction continues as long as the reservoir contains the combustible which continues to be drawn upwardly by the wick because of the higher temperature prevalent at the upper end thereof.

The catalyst masses described in the following examples result in a temperature of the interface between the catalyst mass and the diffuser of 570° C. to 615° C. under normal operating conditions and a high temperature at low catalytic burner-operating rates which is extremely desirable.

The catalyst masses operate with a spatial velociity of 88 to 146 for methane and 20 to 42 for other hydrocarbons such as butane and propane.

The conversion of the hydrocarbon under these conditions is about or upwards of 0.95 to 0.97 and thus usually close to unity, depending on the mass selected and the gas used. The contact mass of the invention is generally of low cost and wide application, capable of use in heating applications or in other systems for producing flameless combustion at relatively moderate temperatures.

SPECIFIC EXAMPLES

In the following specific Examples, catalyzer compositions are given which have been found to be preferred compositions within the ranges stated for the catalyzer materials. In each case the catalytic material which can be of the type described in my earlier patents is applied on a mat of silico-alumina fibers.

EXAMPLE I

The catalyzer is constituted by platinum and aluminum oxide ($Al_2O_3$).

In one test the alumina is first applied to the support layer and appears to complement the latter as a support material and the platinum is then applied. In a second test the platinum and alumina were deposited by simultaneous crystallization (syncrystallization). Such techniques are described in my earlier patent.

The ratio of the catalyzer to the support (by weight) were:

0.00705 and 0.0105 for platinum;
0.032 and 0.125 for alumina.

The compositions were found to be highly effective in the oxidation of methane, butane, propane and heptane as described.

EXAMPLE II

The catalyzer is constituted by platinum, chromium oxide $Cr_2O_3$ and cobalt oxide $Co_2O_3$. The materials were applied by syncrystallization to the silico-alumina support.

The weight ratios of catalyst-support were:
0.0024 to 0.00705 for platinum.
0.050 to 0.052 for the chromium oxide
About 0.050 for the cobalt oxide.

This catalytic composition was particularly effective for the oxidation of butane, propane and heptane.

EXAMPLE III

The catalyzer was constituted by platinum and cerium oxide $CeO_2$. The materials were applied by synchrstalization to the silico-alumina support and the weight ratio of catalysts to support was about 0.012 for platinum and about 0.043 for the cerium oxide. This composition was absolutely effective for the oxidation of methane.

EXAMPLE IV

The catalyzer was constituted by platinum, palladium and cerium oxide $CeO_2$.

The catalyzer components were applied to the silico-alumina support by syncrystallization and the weight ratio of catalysts to support was about:
0.0071 for palladium
0.0008 for platinum
0.0228 for the cerium oxide This catalyst, operating under the conditions stated, was especially effective for the oxidation of methane.

EXAMPLE V

The catalyzer was constituted by platinum and the cerium oxide $CeO_2$ which were applied by syncrystallization to the silico-alumina support so that the ratios by weight of catalyst/support was of the order of 0.0076 for the platinum and 0.0028 for the cerium oxide.

This composition was absolutely effective for the oxidation of methane.

EXAMPLE VI

The catalyzer was constituted by platinum and chromium oxide $Cr_2O_3$ and tests were made in systems in which the chromium oxide was first deposited to assist in the supporting function as well, and in which both substances were applied by syncrystallization to the silico-alumina support. Substantially identical results were obtained. The ratio by weight catalyst/support was between 0.00240 and 0.00705 for platinum and the order of 0.103 for the chromium oxide. This composition was especially effective for the oxidation of methane.

I claim:

1. A catalyst mass for the heterogeneous contact catalyst of reactions, especially the flameless combustion of hydrocarbons, which consists essentially of an iron-free silico-alumina fiber support with proportions of silica and alumina respectively between 40% and 60% by weight and substantially free from impurities, and an iron-free catalyzer consisting essentially of at least one element in elemental form and at least one oxide of an element selected from the groups III, VI, VIIIb, VIIIc and the rare-earth elements of the Periodic Table, the weight ratio of the element, in elemental form, to the support being substantially 0.001 to 0.02 and the weight ratio of the oxide to the support being substantially 0.01 to 0.2, said support having a density between 0.04 and 0.1, a specific surface between 0.5 and 1 $m^2/g$, and a thermal stability sufficient to preclude modification of the surface and texture upon prolonged exposure to temperatures up to 900° C.

2. The catalyst mass defined in claim 1 wherein the element in elemental form is different from the element of the oxide.

3. The catalyst mass defined in claim 2 wherein said elements are selected from the group which consists of aluminum, chromium, cobalt, platinum, palladium and cerium.

4. The catalyst mass defined in claim 3 wherein the catalyzer consists of platinum and alumina with a weight ratio of catalyzer to support btween 0.00705 and 0.0105 for platinum and between 0.032 and 0.125 for the alumina.

5. The catalyst mass defined in claim 3 wherein the catalyzer is constituted by platinum, chromium oxide and cobalt oxide with a ratio of catalyzer to support by weight between 0.0024 and 0.00705 for platinum, of the order of 0.052 for the chromium oxide and of the order of 0.050 for the cobalt oxide.

6. The catalyst mass defined in claim 3 wherein the catalyzer is constituted by platinum and the cerium oxide $CeO_2$ in which the weight ratio of catalyzer to support is of the order of 0.012 for the palladium and of the order of 0.043 for the cerium oxide.

7. The catalyst mass defined in claim 3 wherein the catalyzer is constituted by platinum, palladium and the cerium oxide $CeO_2$ in which the weight ratio of catalyst to support is of the order of 0.0071 for the palladium, 0.0008 for the platinum and 0.0228 for the cerium oxide.

8. The catalyst mass defined in claim 3 wherein the catalyzer is constituted by platinum and cerium oxide and the weight ratio of the catalyzer to the support is of the order of 0.0076 for the platinum and 0.028 for the cerium oxide.

9. The catalyst mass defined in claim 3 which is constituted by platinum and chromium oxide in which the weight ratio of the catalyzer to the support is between 0.00240 and 0.00705 for the platinum and of the order of 0.103 for the chromium oxide.

* * * * *